C. H. J. DILG.
ROLL FOR POLISHING MACHINES.
APPLICATION FILED MAY 23, 1917.
1,323,969.
Patented Dec. 2, 1919.
2 SHEETS—SHEET 1.
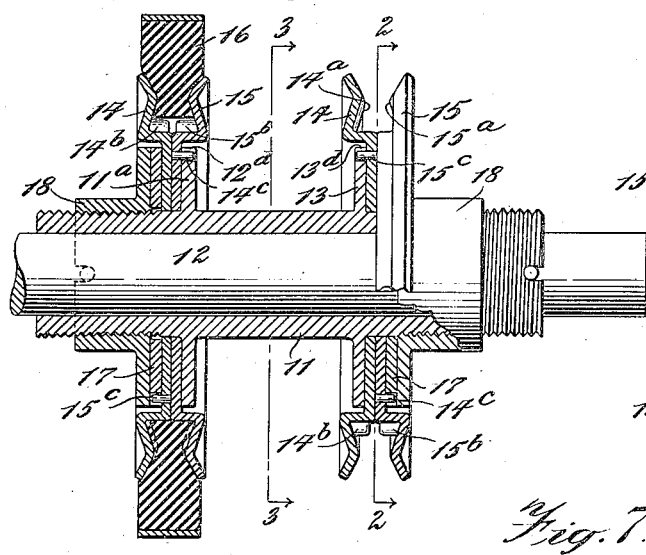
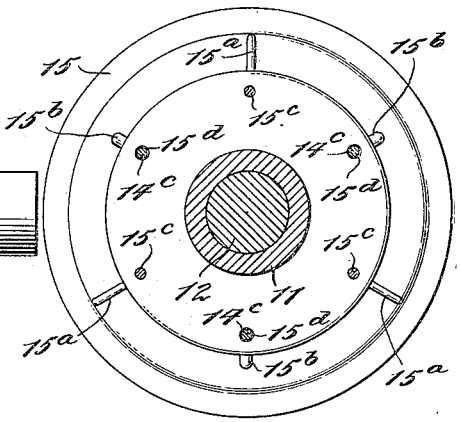
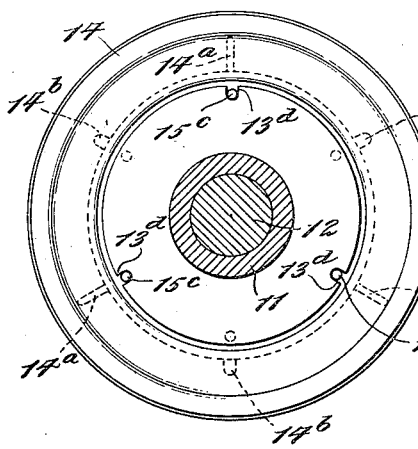
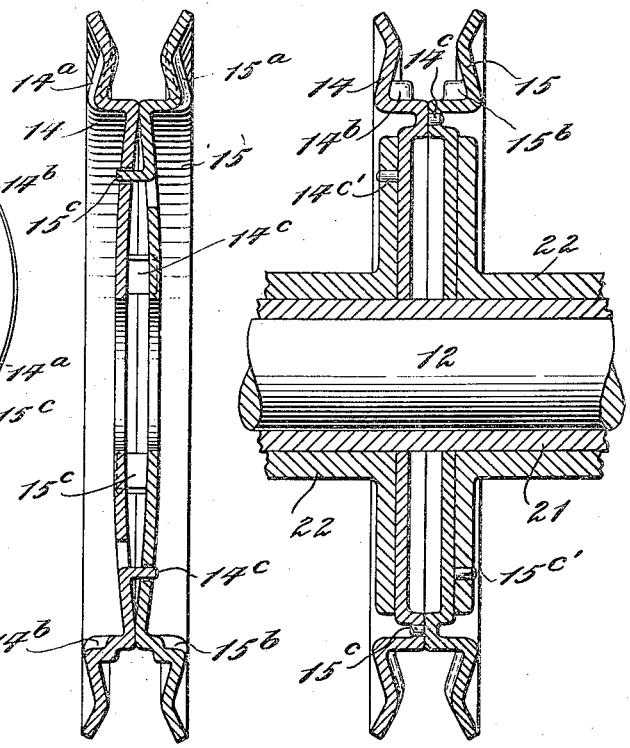

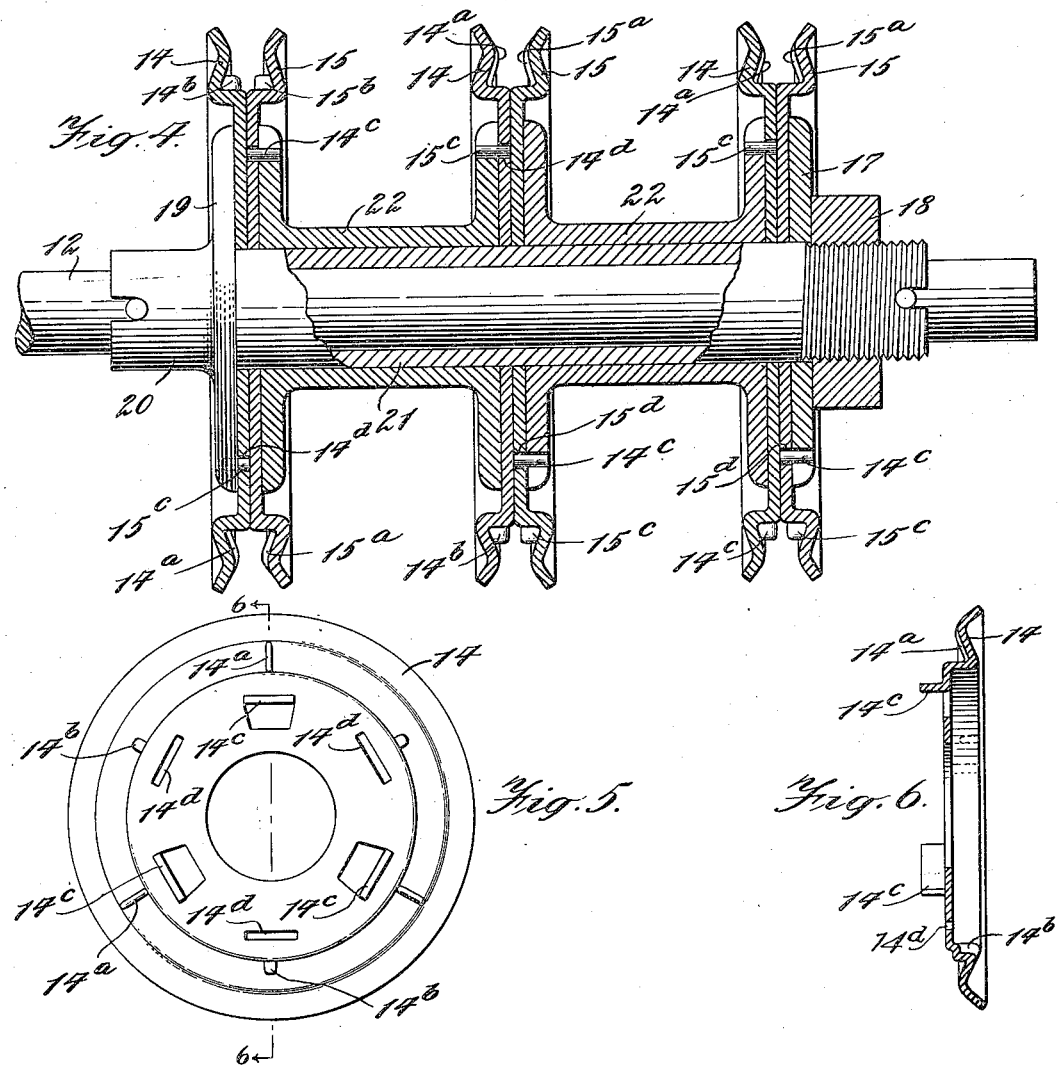

UNITED STATES PATENT OFFICE.

CHARLES H. J. DILG, OF NEW YORK, N. Y.

ROLL FOR POLISHING-MACHINES.

1,323,969.	Specification of Letters Patent.	Patented Dec. 2, 1919.

Application filed May 23, 1917. Serial No. 170,355.

*To all whom it may concern:*

Be it known that I, CHARLES H. J. DILG, a citizen of the United States, residing at the city of New York, in the borough of Manhattan and State of New York, have invented certain new and useful Improvements in Rolls for Polishing-Machines, of which the following is a full, clear, and exact description.

My invention relates to polishing machines designed for cleaning and polishing metal articles, such as cutlery, and relates particularly to the polishing rolls of such machines.

These rolls commonly consist of a rubber ring which is faced with leather and clamped between two plates mounted upon a rotative shaft. An object of this invention is to provide clamping plates and means for rotatively locking the same to the shaft which will be of simple construction and easy to assemble. Other objects are economy in manufacturing cost and reliability in operation. Still other objects and advantages of my invention will appear from the following description.

In accordance with my invention the clamping plates are made interchangeable so as to obviate the possibility of mistake in assembling the parts, and so as to economize in the number of parts which it is necessary to have on hand for repair purposes, and the plates are provided with coupling means to engage a flange surrounding the shaft and locked thereto, whereby the parts are rotatively locked together. In the preferred form the opposing faces of the clamping plates are made to interlock, and preferably the interlocking means also serve to rotatively lock the plates to the flange on the hub. The interlocking means are shown as consisting of one or more projections, such as pins, tongues or lugs, and holes or orifices shaped to receive the projections, the locking projections and orifices being homologous on the two plates so that the projections of one will enter the orifices in the other when the two are fitted together. Preferably the projections are long enough to protrude through the opposing plate and enter correspondidng orifices in the flange.

A clamping washer may be used to oppose the flange, which has orifices to receive the protruding projections of the plate adjacent the flange, and a nut may engage screw threads on a hub or sleeve and hold the washer in clamping position. In the case of a plurality of rolls being carried on one shaft, a spacing collar or sleeve may be provided surrounding the sleeve portion of the hub in each space between adjacent rolls and extending between the two rolls and having a flange on each end, the flange which opposes the flange on the hub serving as the clamping washer above described, and the other flange serving as the stationary flange on the hub. In this construction the flange on the hub is on the outer side of one of the end rolls, and a washer and nut is provided on the outer side of the other end roll.

My invention also comprehends various other features of construction and arrangements, and combinations of parts as will hereinafter more fully appear.

I shall now describe the embodiments of my invention illustrated in the accompanying drawings and shall thereafter point out my invention in claims.

Figure 1 is a longitudinal central section, partially in elevation, of a pair of rolls embodying my invention, a portion of the driving shaft upon which the rolls are mounted being shown and the rubber ring being removed from one of the rolls;

Figs. 2 and 3 are transverse sections of the same on the lines 2—2 and 3—3, respectively, of Fig. 1;

Fig. 4 is a view similar to Fig. 1 showing a modified embodiment of my invention;

Fig. 5 is an inner face view of a clamping plate stamped from sheet metal;

Fig. 6 is a central section of the same on the line 6—6 of Fig. 5;

Fig. 7 is a central sectional elevation of a pair of clamping plates of a modified construction;

Fig. 8 is a view similar to Fig. 1 showing a single roll embodying another modification of my invention.

In the construction shown in Fig. 1, the two rolls have a common hub or sleeve member 11, which is locked to the driving shaft 12 by pins as shown, and is provided with two integral flanges 11ª and 13 to which the clamping plates of the respective rolls are secured. The clamping plates 14 and 15 of each roll are duplicates in construction and each is an annular member fitting over the sleeve 11 outside of the respective flange on the hub 11.

The inner annular portions of the clamping plates are shown as generally plane, and since these portions are made to interlock, I term them the "locking portions" of the plates. The annular portions outside of the locking portions are offset outwardly for the reception of the polishing ring 16 and I therefore term these portions the "clamping portions" of the plates. Due to the outward offsetting of the clamping portions, an annular shoulder is provided which forms a seat for the inner periphery of the polishing ring 16, while the side faces of the clamping portions are concaved to grip the ring, this construction being generally that shown in the previous Patent No. 667,500 to myself and C. F. Dilg. To prevent the rubber ring from creeping or traveling circumferentially on its seat, radial ribs 14$^a$ and 15$^a$ are preferably provided on the inner face of the respective clamping portions, which will impinge within the soft rubber; and in lieu thereof, or in addition thereto, the clamping plates may be provided with longitudinally extending retaining means which engage in one or more recesses in the inner periphery of the ring 16. In the construction shown, the plates are provided at the bottom of their clamping portions with three ribs or lugs 14$^b$ and 15$^b$, respectively, which are equally spaced and engage in the recesses of the ring 16 as shown in Fig. 1, although it is apparent that other suitable means, such as a screw passing through threaded orifices, could be substituted for the lugs or ribs 14$^b$ and 15$^b$.

As interlocking means, the locking portions of the plates are provided with one or more locking lugs or pins, and a corresponding number of holes or orifices for the reception of lugs or pins of the opposing member.

Each plate is shown as provided with three equally-spaced pins or lugs 14$^c$ and 15$^c$, respectively, and the same number of equally-spaced orifices 14$^d$ and 15$^d$, respectively, the orifices alternating with the pins. The pins are provided on the inner face of the locking portions, and since the locking pins and orifices are homologous on the two members, it is manifest that the pins of each plate will fit into the orifices of the opposing plate.

The pins 14$^c$ and 15$^c$ are made of sufficient length to protrude some distance through the opposing plate, and the flanges 11$^a$ and 13 are provided with a corresponding number of equally-spaced orifices 12$^d$ and 13$^d$, respectively, into which the pins, which protrude through the plate adjacent the respective flange, will engage. In this manner, the clamping plates are rotatively locked together and to the driving flanges.

To clamp the plates against their respective flanges, a clamping washer is used outside of the plates and is held in place by a clamping nut which engages screw threads on the end of the sleeve or hub 11. The clamping washers 17 are provided with orifices similar to those in the flanges 12 and 13 for the reception of the locking pins which protrude through the adjacent plate, and the clamping nuts 18 are shown as provided with a flange for bearing against the clamping washers 17.

Thus it will be seen that the clamping plates are rendered interchangeable and the necessity for care in selecting the order of assembling the plates on the sleeve is obviated. In assembling the parts, the operator has only to place the ring 16 within the clamping portion and turn the plates until the locking pins of the one enter the locking orifices of the other, and then adjust the plates so that the inwardly protruding pins enter the orifices in the respective flanges and then apply the clamping washers 17 and the nuts 18. It will be observed that not only may the clamping plates be used interchangeably on the one shaft, but that they will run in either direction and therefore may be employed on either of the two coöperative driving shafts indifferently.

An alternative construction is shown in Fig. 4 which may be employed when there are a plurality of rolls on a shaft. In this case three rolls are shown, and the flange 19 on the hub 20 is arranged exteriorly of one of the end rolls, while the clamping washer 17 forms the outer clamp for the other end roll, being held in clamping position by the nut 18 on the threaded end of the sleeve portion 21 of the hub 20. In the intermediate spaces between the rolls, spacing collars or sleeves 22, which surround the sleeve portion 21 of the hub member, are employed, and are provided with a flange on each end, the two adjacent inner flanges containing between them the plates of the middle roll and the two end flanges coöperating with the flange 19 and the washer 17 to clamp the plates of the end rolls. These flanges are provided with orifices for the reception of the protruding locking pins, and in this manner a continuous train is formed, the rotation of the hub 19 being received and imparted by the locking pins 14$^c$ and 15$^c$ of the successive pairs of clamping plates.

Instead of being cast the clamping plates may be stamped from sheet metal, as shown in Figs. 5, 6 and 7. When the plates are so formed the locking projections 14$^c$ may be struck out from the metal as shown, forming elongated tongues, and the locking orifices 14$^d$ will then be cut out in the form of elongated slots of the proper size to receive and fit over the projections 14$^c$. It is manifest that any other suitable form of locking means might be provided, such as interlocking striations or radiating teeth.

In order to insure that the edges of the seat for the rubber ring 16 will be brought together, the locking portions of the plates may be spread apart at the middle and normally merely meet at their outer circumferential edges. As clamping pressure is applied to the two plates, it is apparent that the greatest pressure will be received at the edges which form the ring seat. Figs. 7 and 8 illustrate constructions in which this expedient is adopted. In Fig. 7 the plates are resilient sheet metal and the locking portions are dished or bent outwardly, as shown. Before clamping pressure is applied, they assume the position shown in Fig. 7, and it is apparent that as they are flattened out by the clamping pressure, the greatest pressure is exerted at the outer or ring-seat edges and the plates will therefore be securely held together at their outer meeting edges.

In Fig. 8, a construction is shown for effecting this same result which is specially applicable to the cast or non-resilient, plates. In this construction, the locking portion of the plates is made concavo-convex and are provided with the locking pins 14$^c$ and 15$^c$ and the corresponding locking orifices on their marginal meeting faces. In this construction, supplemental locking pins 14$^{c'}$ and 15$^{c'}$ are provided on the concavo-convex portion of the plates for engaging in the orifices of the clamping flanges.

It is obvious that various modifications may be made in the constructions shown in the drawings and above particularly described within the principle and scope of my invention.

I claim:

1. A roll for polishing machines comprising two clamping plates having central axial openings for receiving the shaft and outer annular clamping portions between which the polishing ring is clamped and inner annular locking portions between the respective clamping portions and central openings, the locking portions having their adjacent faces shaped to interlock, and a flange carried by the shaft, one of the locking portions having locking engagement with the flange, whereby the parts are rotatively locked together.

2. A roll for polishing machines comprising two similar clamping plates having central axial openings for receiving the shaft and outer annular clamping portions between which the polishing ring is clamped and inner annular locking portions between the respective clamping portions and central openings, the locking portions having their adjacent faces shaped to interlock, and a hub member adapted to fit over the shaft and to be locked thereto and having a flange portion, one of the locking portions having locking engagement with the flange on the hub, whereby the parts are rotatively locked together.

3. A roll for polishing machines comprising two clamping plates having central axial openings for receiving the shaft and outer annular clamping portions between which the polishing ring is clamped and inner annular locking portions between the respective clamping portions and central openings, and a flange carried by the shaft, the flange and the adjacent locking portion having a registering locking orifice and the other locking portion having a locking projection arranged to enter the said orifice and rotatively lock the parts together.

4. A roll for polishing machines comprising two clamping plates having central axial openings for receiving the shaft and outer annular clamping portions between which the polishing ring is clamped and inner annular locking portions between the respective clamping portions and central openings, and a hub member adapted to fit over the shaft and to be locked thereto and having a flange thereon, the flange and the adjacent locking portion having a registering locking orifice and the other locking portion having a locking projection arranged to enter the said orifice and rotatively lock the parts together.

5. A roll for polishing machines comprising two similar clamping plates having central axial openings for receiving the shaft and outer annular clamping portions between which the polishing ring is clamped and inner annular locking portions between the respective clamping portions and central openings, a hub member carried by the shaft and locked thereto and having a flange thereon provided with an orifice, each locking portion being provided with a locking projection and orifice so spaced as to interlock with those of the other locking portion and the projection being of sufficient length to protrude through the opposing plate and engage in the orifice of the flange, whereby the clamping plates are interchangeable, and clamping means coöperating with the flange to clamp the two plates together.

6. A roll for polishing machines comprising a hub member including a sleeve portion adapted to surround the shaft and to be locked thereto and having a flange thereon provided with an orifice, two similar clamping plates having central axial openings fitting upon the sleeve and outer annular clamping portions between which the polishing ring is clamped and inner annular locking portions between the respective clamping portions and central openings, each locking portion being provided with a locking projection and orifice so spaced as to interlock with those of the other locking portion and the projection being of sufficient length to protrude through the opposing plate and engage in the orifice of the flange, whereby the clamping plates are interchangeable, and clamping means surrounding the sleeve and opposing the flange and having an orifice for receiving the protruding locking projection of the plate adjacent the flange.

7. A roll for polishing machines comprising a hub member including a sleeve portion adapted to surround the shaft and to be locked thereto and having a flange thereon provided with an orifice, two similar clamping plates having central axial openings fitting upon the sleeve and outer annular clamping portions between which the polishing ring is clamped and inner annular locking portions between the respective clamping portions and central openings, each locking portion being provided with a locking projection and orifice so spaced as to interlock with those of the other locking portion and the projection being of sufficient length to protrude through the opposing plate and engage in the orifice of the flange, whereby the clamping plates are interchangeable, a washer on the sleeve opposing the flange and having an orifice for receiving the protruding locking projection of the plate adjacent the flange, and clamping means on the sleeve to lock the washer in clamping position.

8. In a roll for polishing machines, two similar clamping plates for holding the polishing ring, each clamping plate having a central shaft-opening and an outer annular clamping portion and an inner annular locking portion between the clamping portion and the shaft opening, the opposing faces of the locking portions having a corresponding locking projection and depression, the depression of one being adapted to receive the projection in the other, whereby the two clamping plates are interchangeable and interlocking.

9. In a roll for polishing machines, two similar clamping plates for holding the polishing ring, each clamping plate having a central shaft-opening and an outer annular clamping portion and an inner annular locking portion between the clamping portion and the shaft opening, the locking portions being concaved or dished and arranged with their peripheral edges meeting, whereby the clamping pressure will be received by their meeting edges.

10. A roll for polishing machines comprising two similar clamping plates having central axial openings for receiving the shaft and outer annular clamping portions between which the polishing ring is clamped and inner annular locking portions between the respective clamping portions and central openings arranged to fit together, the locking portions being concaved or dished and arranged with their peripheral edges meeting, a hub member adapted to fit over the shaft and to be locked thereto and having a flange portion, and locking means coupling the two locking portions and engaging the flange on the hub, whereby the parts are locked against independent rotation.

In witness whereof, I subscribe my signature.

CHAS. H. J. DILG.